United States Patent [19]
Hadtke et al.

[11] Patent Number: 6,062,753
[45] Date of Patent: May 16, 2000

[54] WRITING INSTRUMENT WITH ENHANCED TACTILE CONTROL AND GRIPPING COMFORT AND METHOD OF MAKING SAME

[75] Inventors: Frederick B. Hadtke, New Providence; Linda El-Fakir, Edison, both of N.J.

[73] Assignee: Pentech International Inc., Edison, N.J.

[21] Appl. No.: 09/135,090

[22] Filed: Aug. 17, 1998

[51] Int. Cl.⁷ ..................................................... A46B 5/02
[52] U.S. Cl. ................................................. 401/6; 401/88
[58] Field of Search ............................... 401/6, 88, 131, 401/91, 208, 221

[56] References Cited

U.S. PATENT DOCUMENTS

| | | |
|---|---|---|
| D. 95,135 | 4/1935 | Huber . |
| D. 221,906 | 9/1971 | Collins et al. . |
| D. 252,757 | 8/1979 | Sublette . |
| D. 256,925 | 9/1980 | Postrehovsky-Axel . |
| D. 307,444 | 4/1990 | Poisson et al. . |
| D. 310,101 | 8/1990 | Gauthier . |
| D. 322,460 | 12/1991 | Herbst et al. . |
| D. 324,068 | 2/1992 | Herbst et al. . |
| D. 327,912 | 7/1992 | Tsai . |
| D. 338,039 | 8/1993 | Takahaski . |
| D. 338,915 | 8/1993 | Willat . |
| D. 351,416 | 10/1994 | Oka et al. . |
| D. 358,170 | 5/1995 | Osada ..................... 401/6 X |
| D. 359,508 | 6/1995 | Debbas . |
| D. 359,758 | 6/1995 | Inami . |
| D. 365,364 | 12/1995 | Tseng . |
| D. 375,124 | 10/1996 | Kuo . |
| D. 379,227 | 5/1997 | Rosen . |
| 597,942 | 1/1898 | Blend . |
| 606,551 | 6/1898 | Huffman . |
| 768,985 | 8/1904 | Goldsmith ............... 401/6 X |
| 798,749 | 9/1905 | Rose . |
| 2,173,451 | 9/1939 | Lorber . |
| 2,231,410 | 2/1941 | Kern et al. . |
| 2,318,171 | 5/1943 | Lipic, Jr. . |
| 2,372,914 | 4/1945 | Schweitzer . |
| 2,701,404 | 2/1955 | Richterkessing . |

(List continued on next page.)

FOREIGN PATENT DOCUMENTS

| | | | |
|---|---|---|---|
| 1253384 | 1/1961 | France ....................... | 401/6 |
| 2157175 | 5/1973 | Germany .................... | 401/6 |
| 115884 | 8/1980 | Japan ......................... | 401/6 |
| 2141295 | 5/1990 | Japan ......................... | 401/6 |

*Primary Examiner*—David J. Walczak
*Attorney, Agent, or Firm*—Sperry, Zoda & Kane

[57] ABSTRACT

A writing instrument with enhanced tactile feel, more gripping security and ergonomic comfort which is adaptable to the customized hand geometry of a specific user and can include a barrel with an outer gripping surface wherein the barrel includes a barrel framework with an axial bore extending therethrough to a tip opening. A gripping section is defined on the barrel in the shape of a hollow core member to define a gripping channel extending therearound. The barrel gripping member is mounted in the gripping channel fixedly with respect to the hollow core and is made of a more flexibly resilient and pliable material than the harder material of the barrel framework to facilitate gripping thereof and to enhance tactile control. The barrel gripping member and the barrel framework in combination are co-molded in such a manner as together to define the outer gripping surface of the barrel. A writing medium member extends through the axial bore and outwardly through the tip opening for facilitating marking therewith. The barrel gripping member can include multiple voids defined therein to facilitate the pliability and flexible resilience thereof and for tactile comfort. Also the hollow core member can be bendable to vary the axial geometry of the barrel and the axial bore extending therethrough.

34 Claims, 2 Drawing Sheets

U.S. PATENT DOCUMENTS

| | | |
|---|---|---|
| 2,734,838 | 2/1956 | Clancy et al. . |
| 3,704,071 | 11/1972 | Muller et al. . |
| 3,787,898 | 1/1974 | Walker . |
| 3,875,088 | 4/1975 | Avons et al. . |
| 3,993,408 | 11/1976 | Avons et al. . |
| 4,123,179 | 10/1978 | Pacheco . |
| 4,176,978 | 12/1979 | Ruzicka et al. . |
| 4,490,415 | 12/1984 | Imamura et al. . |
| 5,244,297 | 9/1993 | Bachelet et al. . |
| 5,252,373 | 10/1993 | Ganske et al. . |
| 5,310,345 | 5/1994 | Gershon . |
| 5,354,140 | 10/1994 | Diakoulas . |
| 5,356,232 | 10/1994 | Skinner . |
| 5,358,349 | 10/1994 | Burroughs et al. .......... 401/6 X |
| 5,360,281 | 11/1994 | Kamen et al. . |
| 5,364,197 | 11/1994 | Powers . |
| 5,399,041 | 3/1995 | Chiswell . |
| 5,447,167 | 9/1995 | Fleischaker . |
| 5,468,083 | 11/1995 | Chesar . |
| 5,470,162 | 11/1995 | Rubin . |
| 5,549,779 | 8/1996 | Stoecklein . |
| 5,555,602 | 9/1996 | Leamond . |
| 5,626,430 | 5/1997 | Bistrack . |
| 5,638,566 | 6/1997 | Wu . |
| 5,662,423 | 9/1997 | Walden . |
| 5,683,191 | 11/1997 | Kageyama et al. . |
| 5,716,152 | 2/1998 | Kudo . |
| 5,735,622 | 4/1998 | Melnick et al. . |

WRITING INSTRUMENT WITH ENHANCED TACTILE CONTROL AND GRIPPING COMFORT AND METHOD OF MAKING SAME

BACKGROUND OF THE INVENTION

1. Field of the Invention

The present invention deals with the field of writing instruments generally and, more specifically, applies to pens, markers, marking pens, fountain pens as well as, possibly, pencils and mechanical pencils. Conventionally such designs included a standard barrel housing having a generally cylindrical configuration. Enhanced gripping devices have been utilized which usually include an exterior applied appliance which defines more easily grasped outer contours which can be made from softer more pliable and flexibly resilient material. In regard to textures as well as shape these designs have enhanced the gripping characteristics of the basic writing instrument barrel itself. The present invention, however, provides a uniquely co-molded barrel body wherein the outer flexibly resilient member is co-molded within a channel defines about a, preferably, imperforate interior core usually made of harder plastic material which facilitates manufacture or molding thereof as well as improving tactile control and the ability to customize the barrel by bending thereof as desired by a user's specific hand geometry.

2. Description of the Prior Art

Many devices have been patented for the purpose of improving the gripping characteristics and tactile comfort of writing instruments such as shown in United States Design Pat. No. Des. 95,135 patented Apr. 9, 1935 to O. Huber and assigned to Eagle Pencil Company on a "Design For A Mechanical Pencil"; and United States Design Pat. No. Des. 221,906 patented Sep. 14, 1971 to J. Collins et al and assigned to Collins on a "Writing Implement"; and United States Design Pat. No. Des. 252,757 patented Aug. 28, 1979 to O. Sublette on a "Pen"; and United States Design Pat. No. Des. 256,925 patented Sep. 16, 1980 to P. Postrehovsky-Axel on a "Writing Instrument"; and United States Design Pat. No. Des. 307,444 patented to N. Poisson et al on Apr. 24, 1990 and assigned to The Gillette Company on a "Grip Portion For A Writing Instrument"; and United States Design Pat. No. Des. 310,101 patented Aug. 21, 1990 to R. Gauthier and assigned to Deidre Stanley on a "Combination Cover And Holder For Writing Instrument"; and United States Design Pat. No. Des. 322,460 patented Dec. 17, 1991 to W. Herbst et al and assigned to The Gillette Company on a "Writing Instrument"; and United States Design Pat. No. Des. 324,068 patented Feb. 18, 1992 to W. Herbst et al and assigned to Diesel Kiki Co. Ltd. on a "Writing Instrument Barrel"; and United States Design Pat. No. Des. 327,912 patented Jul. 14, 1992 to C. Tsai on a "Marking Pen"; and United States Design Pat. No. Des. 338,039 patented Aug. 3, 1993 to O. Takahashi and assigned to Kotobuki & Co. Ltd. on a "Writing Instrument"; and United States Design Pat. No. Des. 338,915 patented Aug. 31, 1993 to B. Willat on a "Writing Instrument"; and United States Design Pat. No. Des. 351,416 patented Oct. 11, 1994 to S. Oka et al and assigned to Pentel Kabushiki Kaisha on a "Ball Point Pen"; and United States Design Pat. No. Des. 359,508 patented Jun. 20, 1995 to C. Debbas on an "Ergonomic Pen"; and United States Design Pat. No. Des. 359,758 patented Jun. 27, 1995 to T. Inami and assigned to Pentel of America, Ltd. on a "Grip For A Writing Instrument"; and United Stated Design Pat. No. Des. 365,364 patented Dec. 19, 1995 to C. Tseng and assigned to Sunmex Import Corporation on a "Ballpoint Pen"; and United States Design Pat. No. Des. 375,124 patented Oct. 29, 1996 to W. Kuo on a "Ballpoint Pen"; and United States Design Pat. No. Des. 379,227 patented May 13, 1997 to M. Rosen on a "Reflex-Correspondence Tool"; and U.S. Pat. No. 597,942 patented Jan. 25, 1898 to W. Blend on a "Penholder"; and U.S. Pat. No. 606,551 patented Jun. 28, 1898 to W. Huffman on a "Rubber Attachment For Pencils"; and U.S. Pat. No. 798,749 patented Sep. 5, 1905 to A. Rose on a "Covered Pen, Pencil &."; and U.S. Pat. No. 2,173,451 patented Sep. 19, 1939 to C. Lorber and assigned to Charles Lorber and Winfield R. Offutt on a "Finger Fitting Holder"; and U.S. Pat. No. 2,231,410 patented Feb. 11, 1941 to E. A. Kern et al on a "Cushioned Lead Pencil"; and U.S. Pat. No. 2,318,171 patented May 4, 1943 to J. G. Lipic, Jr. and assigned to Jos. Lipic Pen Co. on a "Holder For Pencils And The Like"; and U.S. Pat. No. 2,372,914 patented Apr. 3, 1945 to A. Schweitzer on a "Pencil Lead Writing Utensil"; and U.S. Pat. No. 2,701,404 patented Feb. 8, 1955 to F. H. Richterkessing and assigned to W. M. Cissell Manufacturing Company, Incorporated on a "Steam Gun With Carding Brush"; and U.S. Pat. No. 2,734,838 patented Feb. 14, 1956 to J. J. Clancy et al and assigned to Arthur D. Little, Inc. on "Wrapped Pencil-Shaped Articles And Method Of Making Same"; and U.S. Pat. No. 3,704,071 patented Nov. 28, 1972 to K. Muller et al and assigned to Bayer Aktiengesellschaft on a "Pencil Having A Formed ABS Polymer Barrel"; and U.S. Pat. No. 3,787,898 patented Jan. 29, 1974 to C. Walker on a "Writing Facilitating Glove"; and U.S. Pat. No. 3,875,088 patented Apr. 1, 1975 to I. Arons et al and assigned to Hasbro Industries, Inc. on "Pencil Sheath Compositions"; and U.S. Pat. No. 3,993,408 patented Nov. 23, 1976 to I. Arons et al and assigned to Hasbro Industries, Inc. on a "Pencil Comprising A Marking Core And A Porous Resin Sheath"; and U.S. Pat. No. 4,123,179 patented Oct. 31, 1978 to N. Pacheco on an "Orthopedic Finger Piece For Writing Instruments"; and U.S. Pat. No. 4,176,978 patented Dec. 4, 1979 to J. Ruzicka et al on a "Pencil Sheath And Composition Therefor"; and U.S. Pat. No. 4,490,415 patented Dec. 25, 1984 to K. Imamura et al and assigned to Asahi Kasei Kogyo Kabushiki Kaisha on a "Method Of Coating A Pencil"; and U.S. Pat. No. 5,244,297 patented Sep. 14, 1993 to J. Bachelet et al and assigned to Conte S. A. on a "Process For Manufacturing Pencil By Tri-Extrusion And The Produced Pencil Having An Intermediate Protective Casing"; and U.S. Pat. No. 5,252,373 patented Oct. 12, 1993 to J. Ganske et al and assigned to WRS Group, Inc. on a "Shock Absorbing Pad"; and U.S. Pat. No. 5,310,345 patented May 10, 1994 to J. Gershon on a "Writing Aid"; and U.S. Pat. No. 5,354,140 patented Oct. 11, 1994 to M. Diakoulas on a "Covered Writing Instrument, And Process For Making Such Writing Instrument"; and U.S. Pat. No. 5,356,232 patented Oct. 18, 1994 to A. Skinner on a "Unified Writing Instrument And Eraser Dispenser"; and U.S. Pat. No. 5,360,281 patented Nov. 1, 1994 to M. Kamen et al and assigned to Revlon Consumer Products Corporation on a "Cosmetic Pencil And Method For Making The Same"; and U.S. Pat. No. 5,364,197 patented Nov. 15, 1994 to R. Powers on a "Cosmetic Pencil With Descending Sheath"; and U.S. Pat. No. 5,399,041 patented Mar. 21, 1995 to E. Chiswell and assigned to BIC Corporation on a "Writing Instrument Barrel And Method Of Forming A Writing Instrument"; and U.S. Pat. No. 5,447,167 patented Sep. 5, 1995 to W. Fleischaker on a "Hand Pressure Level Threshold Sensor"; and U.S. Pat. No. 5,468,083 patented Nov. 21, 1995 to D. Chesar on an "Instrument Hand Grip"; and U.S. Pat. No. 5,470,162 patented Nov. 28, 1995 to B. Rubin on an "Ergonomic Hand-Held Implement"; and U.S. Pat. No. 5,549,779 patented Aug. 27, 1996 to T. Stoecklein and assigned to Schean-Stabilo Schwanhaeusser on a "Process For The Production Of A Pencil"; and U.S. Pat. No. 5,555,602 patented Sep. 17, 1996 to W. Leamond on an "Eraser Assembly"; and U.S. Pat. No. 5,626,430 patented May 6, 1997 to C. Bistrack on an "Adaptable Pressuring Writing Instrument Holder"; and U.S. Pat. No. 5,638,566 patented Jun. 17, 1997 to J. Wu on a "Combined Writing Instrument/Tool Holder"; and U.S. Pat. No. 5,662,423 patented Sep. 2, 1997 to D. Walden on a "Gripping Aid For Writing Implements"; and U.S. Pat. No. 5,683,191 patented Nov. 4, 1997 to S. Kageyama et al and assigned to Kotobuki & Co., Ltd. on a "Writing Tool"; and U.S. Pat. No. 5,716,152 patented Feb. 10, 1998 to N. Kudo and assigned to Zebra Co. Ltd. on a "Writing Tool"; and U.S. Pat. No. 5,735,622 patented Apr. 7, 1998 to N. Melnick et al and assigned to Pentech International Inc. on a "Writing Instrument With A Compressible Friction Coating And Method Of Making".

SUMMARY OF THE INVENTION

The present invention provides an improved writing instrument which has enhanced tactile control and added gripping comfort wherein a pen barrel configuration is included with an outer enhanced gripping surface extending therearound to facilitate holding and control of the writing instrument during marking therewith. Usually the barrel is elongated and is generally cylindrical in shape but can be designed with any shape capable of being gripped during marking usage. The barrel includes a barrel framework which defines a tip opening and a top opening therein spatially disposed from one another interconnected by a bore extending therebetween. The barrel framework is preferably flared outwardly in the area adjacent the top opening to facilitate access thereinto.

The barrel framework preferably defines the axial bore extending longitudinally therefrom from the tip opening to the top opening which is similarly flared in the area adjacent the top opening, as is the barrel framework itself. In the preferred configuration the barrel framework is made of a high density polypropylene to facilitate the rigidity and strength thereof. The actual material of the barrel framework can be any material which is somewhat harder than the barrel gripping member co-molded therein. Normally this framework is made of a somewhat hard plastic moldable material.

The barrel framework preferably is formed with a longitudinally extending channel running from the gripping section along the outer gripping surface of the barrel toward the top opening. Also, the barrel can include a threaded collar member fixedly secured adjacent the tip opening thereof and extending around that tip opening.

A gripping section may be defined on the barrel framework adjacent the tip opening which is adapted to facilitate gripping of the writing instrument during use. The gripping section preferably includes a hollow core member which is tubular in shape with the axial bore extending therethrough in an axial fashion. The hollow core member and the barrel framework define a gripping channel therearound at the gripping section. The gripping section is capable of deforming in such a manner as to customize the shape of the barrel for facilitating grasping thereof in accordance with the specific geometry of the hand of the user. The hollow core member and the gripping section are preferably imperforate throughout the gripping channel to define the gripping channel in such a manner that it can receive the co-molded more pliable material of the barrel gripping member.

The barrel gripping member itself is formed of a material which is more flexibly resilient and more pliable than the barrel framework and is preferably molded with a thermoplastic rubber elastomer to enhance this flexible resilience. In the preferred configuration, the barrel gripping member is fixedly mounted within the gripping channel extending through the hollow core member of the gripping section of the barrel and fixedly secured thereto.

The more rigid barrel gripping member and the more pliable barrel framework together define the outer gripping surface of the barrel housing. The barrel gripping member also defines a plurality of compression slots and concave dimples therein to facilitate the flexible resilience thereof. The compression slots preferably extend laterally around the periphery of the barrel gripping member generally perpendicularly with respect to the axial bore for enhancing flexibility thereof. In one of the improved designs, the concave dimples are positioned at least partially coextensive into the compression slots in such a manner as to further enhance the flexible resilience in cooperation with those compression slots.

A supplemental gripping member is also preferably included positioned within the longitudinal channels extending from the gripping area to the top opening in such a manner as to enhance gripping of the barrel of the user and for decorative purposes. The supplemental gripping member is made of a material more flexibly resilient than the barrel framework to enhance tactile control and gripping comfort thereof. Preferably this supplemental gripping means will also be made of a thermoplastic rubber elastomer similar to the barrel gripping member and can be molded at the same time along with the barrel gripping member. In most configurations the supplemental gripping member and the barrel gripping member will comprise one integrally molded member positioned in the gripping channel and the longitudinal channel defined by the barrel framework member.

A conical guide member can also be included defining a guide slot extending axially therethrough. The threaded collar member is preferably engageable with respect to the conical guide member for facilitating securement therebetween with the guide slot in registration with respect to the tip opening and the axial bore. A medium supply member can be included for holding and dispensing writing medium and can include a medium reservoir for retaining writing medium such as ink or marking fluid therein as well as a dispensing kit in fluid flow communication with the medium reservoir for facilitating dispensing of writing medium therefrom as desired. The medium retaining device is preferably positionable within the axial bore of the barrel framework and within the guide slot of the conical guide member with the dispensing tip extending outwardly therethrough to facilitate marking as desired.

It is an object of the present invention to provide an improved writing instrument with enhanced tactile control and gripping comfort which can be co-molded with a framework of relatively hard injected plastic along with a gripping insert of more pliable flexibly resilient material.

It is an object of the present invention to provide an improved writing instrument with enhanced tactile control and gripping comfort which can be formed of a framework of rigid high density polypropylene and a more flexibly resilient and pliable thermoplastic rubber elastomer.

It is an object of the present invention to provide an improved writing instrument with enhanced tactile control and gripping comfort which includes a rigid plastic framework with a hollow imperforate core member with a soft foam rubber insert co-molded therewith and positioned therein.

It is an object of the present invention to provide an improved writing instrument with enhanced tactile control and gripping comfort which maintains the flexibly resilience of the gripping member despite the relatively inflexible hollow core member about which it is molded by the introduction of voids in the outer surface of the gripping member.

It is an object of the present invention to provide an improved writing instrument with enhanced tactile control and gripping comfort which includes a gripping member having a plurality of compression slots defined in the outer surface thereof to enhance flexible resilience thereof.

It is an object of the present invention to provide an improved writing instrument with enhanced tactile control and gripping comfort which includes a gripping member having a plurality of concave dimples defined in the outer surface thereof to enhance flexible resilience thereof.

It is an object of the present invention to provide an improved writing instrument with enhanced tactile control and gripping comfort which provides enhanced tactile feel by the inclusion of recessed dimples in the outer surface of the gripping member.

It is an object of the present invention to provide an improved writing instrument with enhanced tactile control and gripping comfort which include a hollow core member in the barrel framework which is bendable to bend the barrel axially for altering the geometric shape of the barrel to enhance customized design in accordance with the particular shape or size of a user's hand.

It is an object of the present invention to provide an improved writing instrument with enhanced tactile control and gripping comfort which includes protruding bumps on the exterior surface of the barrel to prevent the pen from rolling on the front surface.

It is an object of the present invention to provide an improved writing instrument with enhanced tactile control and gripping comfort which includes bumps on the exterior surface of the barrel to facilitate gripping of the pen barrel exterior with respect to a pen cap positioned therearound.

It is an object of the present invention to provide an improved writing instrument with enhanced tactile control and gripping comfort which is easy and inexpensive to manufacture.

It is an object of the present invention to provide an improved writing instrument with enhanced tactile control and gripping comfort which has a minimum number of moving parts.

It is an object of the present invention to provide an improved writing instrument with enhanced tactile control and gripping comfort which can be produced at very high volume at very low cost.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

The writing instrument 10 of the present invention includes a barrel 12 defining an outer gripping surface 14. The barrel 12 is designed to be held by a user at the outer gripping surface 14 thereof to facilitate use of the writing instrument 10 in a conventional manner. The present invention provides enhanced gripping and tactile control of this outer gripping surface 14 which is preferably formed as a co-molded member.

The firstly molded member comprises the barrel framework 16 which is preferably formed of a more rigid plastic such as a high density polypropylene. The barrel framework 16 includes a tip opening 18 as well as a top opening 20. These two openings are connected in fluid flow communication with respect to one another by an axial bore 22 which extends therebetween longitudinally through the barrel framework 16.

Barrel framework 16 defines a gripping section 24 preferably positioned adjacent to the tip opening 18. This gripping section 24 preferably is formed as a gripping channel 28 defined in the barrel framework 16 with a hollow core member 26 at the base of this gripping channel 28. The hollow core member 26 preferably is a liner extending about the outermost boundary of the axial bore 22. In the preferred configuration the gripping channel 28 defined by the hollow core member 26 and the other portions of the barrel framework 16 will be imperforate and will provide an interior surface for molding the barrel gripping member 30 therewithin.

Barrel gripping member 30 will preferably be of a more flexibly resilient material than the material of the barrel framework 16. This material of the barrel gripping member 30 will preferably be a thermoplastic rubber elastomer but any material more flexibly resilient than the material of the barrel framework 16 will achieve a similar purpose.

In the preferred method of manufacture of a pen in accordance with the present invention, the barrel framework 16 will be initially molded of a fairly rigid material such as high density polypropylene and will define therein the gripping channel 28 extending therearound adjacent to the tip opening 18 with an imperforate hollow core member 26 in the bottom of the channel 28. In this manner the barrel gripping member 30 can be molded in the gripping channel 28 such that the gripping channel defines the mold within which the barrel gripping member 30 is formed of the thermoplastic rubber elastomer or other similar material.

During molding of more pliable materials such as thermoplastic rubber elastomers, it is sometimes difficult to form a channel or bore therethrough because the core member of the mold must be withdrawn from the finally configured member. In forming the barrel gripping member of the present invention, this problem is overcome by forming the gripping channel 28 imperforate. As such, the axial bore is formed in the thermoplastic rubber elastomer by being formed around the hollow core member 26 rather than around a mold member that must be removed after the molding process is completed. Thus the barrel gripping member 30 formed of this more pliable material with tend to adhere to the hollow core member of high density polypropylene rather than to an interior mold component such as a shaft that must later be removed. Thus, with this improved molding process, the tendency of the thermoplastic rubber elastomer to adhere to such interior mold parts becomes an advantage rather than a difficulty since adherence between the barrel gripping member 30 and the hollow core member 26 is desired in the final configuration. In this manner, ease of manufacture is significantly enhanced and yet an improved design is achieved for a writing instrument with an enhanced gripping member 30 of a thermoplastic rubber elastomer fixedly molded and secured within the gripping channel 28 of a barrel framework made from a harder material such as a high density polypropylene.

A conventional medium supplying means 32 is included with the present invention which is designed to contain a writing medium 34 within the medium reservoir 36 thereof. The medium supplying means 32 will include a dispensing tip 38 for dispensing of the medium during marking or writing therewith in a conventional manner. This dispensing tip 38 can comprise a ballpoint dispensing tip, a felt marking nib of a conventional marking head designed for releasing writing medium when marking upon any substrate thereadjacent.

Figure 1:
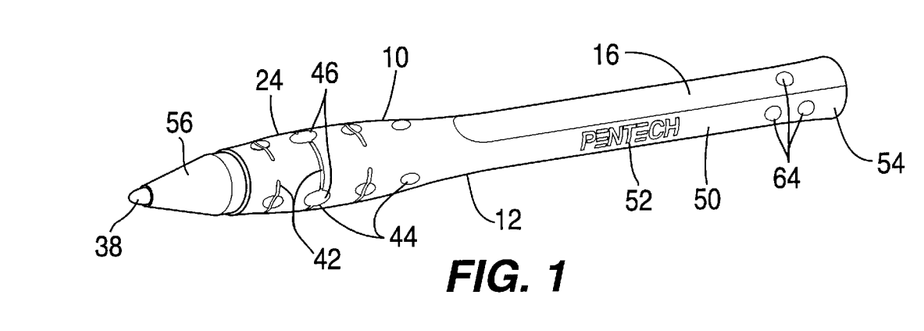
FIG. 1 is a perspective illustration of an embodiment of the improved writing instrument of the present invention.
Figure 2:
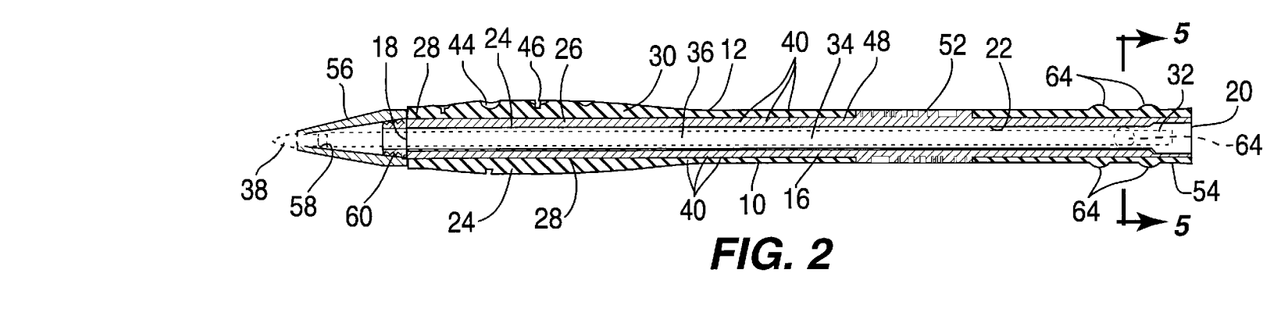
FIG. 2 is a cross-sectional view of an embodiment of the improved writing instrument of the present invention.

With the molding of the barrel gripping member 30 and affixing thereof within the gripping channel 28 some of the flexible resilience thereof will be lost due to the rigidity of the hollow core member 26. This flexible resilience is recaptured by the inclusion of a plurality of compression slots 42 in the exterior surface thereof. These compression slots 42 can be oriented in any direction but in the preferred configuration as shown in FIG. 2, will extend at least partially circumferentially about the outermost cylindrical gripping surface of the barrel gripping member 30. Also a plurality of concave dimples 44 can be positioned in the exterior preferably convex gripping surface of the barrel gripping member 30. Concave dimples 44 and compression slots 42 each add pliability and flexible resiliency to the overall structure of the barrel gripping member 30 for enhancing the flexible resilience thereof. Dimples 44 and slots 42 also are somewhat decorative and increase tactile control and comfort when a user is grasping the writing instrument.

To further aid in maximizing this flexible resilience the compression slots 42 and the concave dimples 44 can overlap one another such as to define coextensive areas 46 therebetween which adds pliability and flexible resilience in multiple directions due to the cooperating relationship between the overlapping slots 42 and dimples 44.

In order to further provide an ability to customize the configuration of the writing instrument 10 of the present invention, the gripping section 24 at the hollow core member 26 will preferably include a bendable portion 40. This bendable portion 40 will be capable of altering the longitudinally extending axial geometry of writing instrument 10. In a preferred configuration the entire longitudinally extending portion of the hollow core member 26 itself will be bendable in order to form the bendable portion 40 thereof such that the axial geometry of the writing instrument can be customized to the size and shape and manners of usage of the current user.

In the preferred embodiment, the barrel framework 16 will also define a longitudinally extending channel 48 which will extend from the gripping channel 28 perhaps all the way to the end thereof immediately adjacent the top opening 20. This longitudinal channel can be decorative as well as enhancing the gripping characteristics of the outer surface of the barrel 12. Preferably a supplemental gripping member 50 will be positioned within the longitudinal channel 48 to facilitate grasping thereof and for decorative purposes. Preferably the longitudinal channel 48 will be in fluid flow communication with the gripping channel 28. In this manner the supplemental gripping member 50 can be formed simultaneously and of the same material as the barrel gripping member 30. It is also preferable that the barrel gripping member 30 and the supplemental gripping member 50 be formed as a single integral piece such as to be one continuous grip enhancing member extending entirely through the gripping channel 28 and the longitudinal channel 48.

Figures 4, 5, 6:
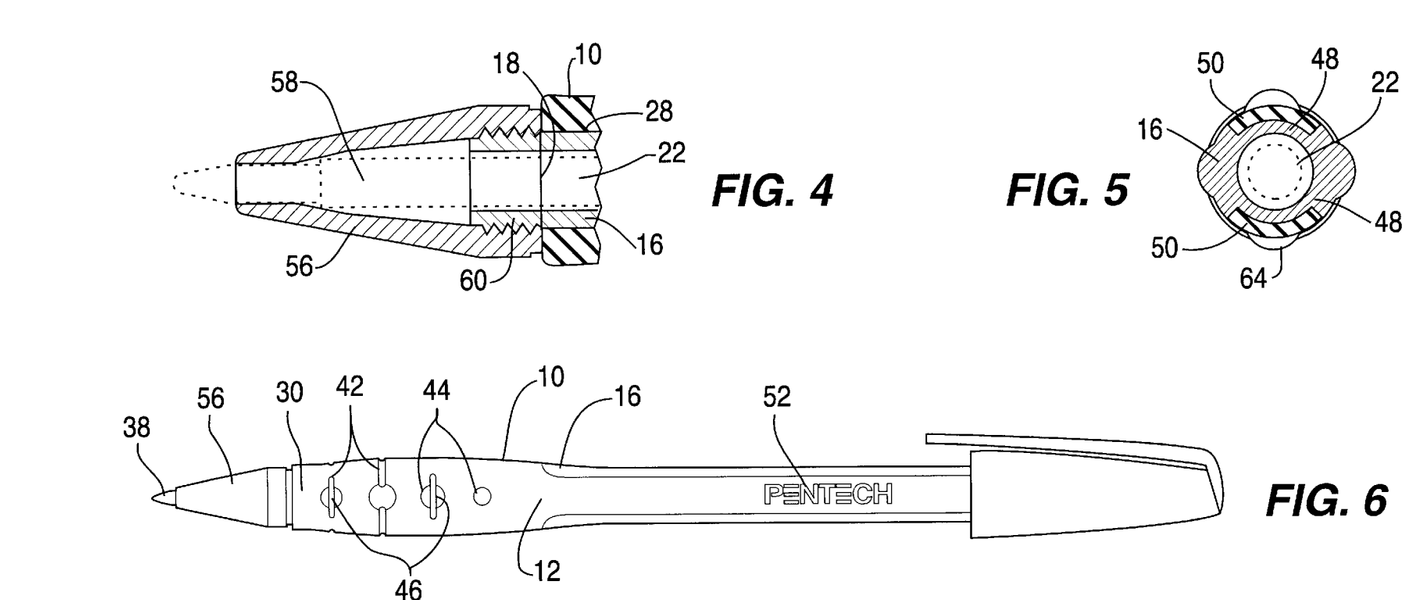
FIG. 4 is a side cross-sectional view of the conical guide member of the present invention.
FIG. 5 is an end cross-sectional view of an embodiment of the improved writing instrument of the present invention.
FIG. 6 is a top plan view of the improved writing instrument with the top shown mounted on the top end thereof ready for marking.
Figure 7:
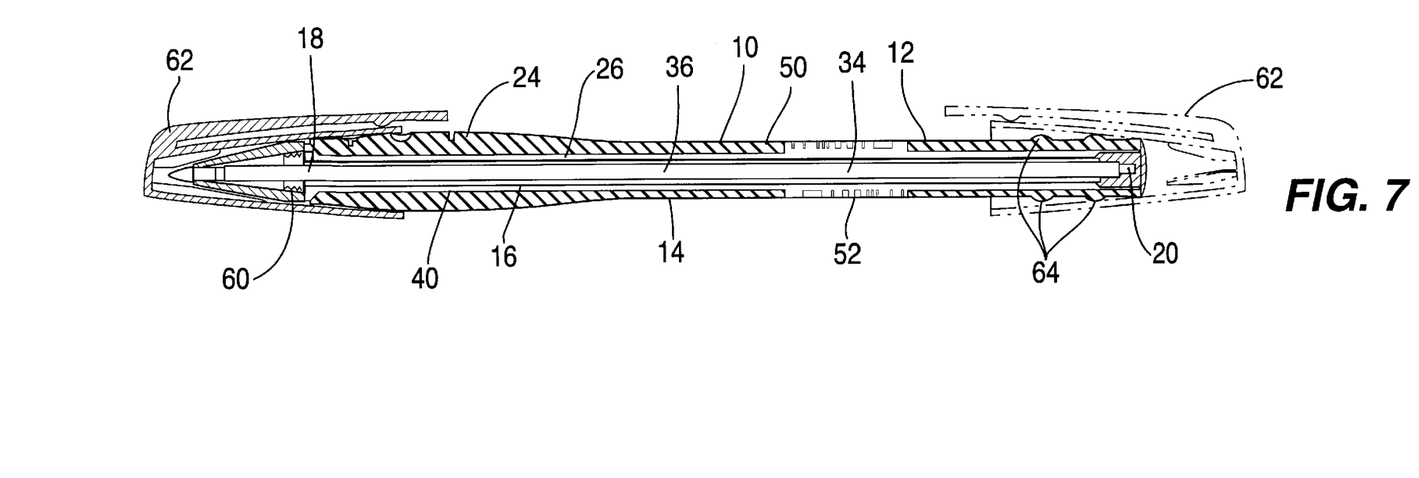
FIG. 7 is a side cross-sectional view of an embodiment of the improved writing instrument of the present invention showing a cap positioned on both the top end and the tip end of the purposes of illustration.

For further decorative or informational purposes, a design display member 52 may be positioned within the longitudinal channel 48. Preferably this design display member 52 can display a trademark or other decorative informational indicia. Preferably this design display member 52 will be formed of the same material as the barrel framework 16 within the longitudinal channel 48 and will extending upwardly therefrom such as to be visible after the supplemental gripping member 50 is molded in place within the longitudinal channel 48. In this manner the design display member 52, as shown best in FIG. 5, will be visible in the finally formed writing instrument 10 for decorative or informational purposes.

In the preferred configuration of the writing instrument 10 of the present invention, the barrel framework 16 will include a flared section 54 in the end thereof to facilitate grasping and to facilitate access to the interior portion of the axial bore 22. The flared section 54 of the barrel framework 16 will also allow the portion of the axial bore 22 immediately therewithin to also be flared to facilitate access to the axial bore 22 such as might be needed for replacement of a new medium supplying member 32 therewithin if deemed necessary.

Figure 3:
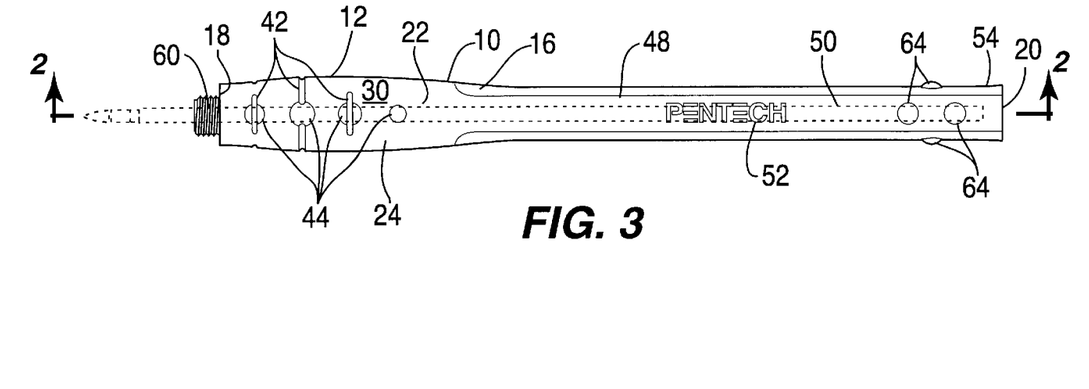
FIG. 3 is a side plan view of an embodiment of the barrel framework of the present invention.

Adjacent the tip opening 18 of the writing instrument 10 of the present invention a conical member 56 can be included. This conical member 56 is adapted to be secured to the barrel framework 16 in any conventional manner. The barrel framework 16 preferably defines a threaded collar 60 fixedly secured thereto as shown best in FIG. 3. This threaded collar 60 can engage a similar mated member on the conical guide member 56 such that the guide slot 58 extending axially through the conical guide member 56 is in alignment with respect to the axial bore 22 of the barrel framework member 16.

In a further preferred configuration of the present invention a cap 62 is positionable snapped into engagement over either end of the barrel 12 extending over the tip opening 18 or alternatively over the top opening 20. When extending over the tip opening 18 the cap is designed to prevent drying or unwanted dispensing of writing media. When positioned over the top opening 20 the cap is designed to be stored to prevent loss thereof.

The barrel framework 16 of the present invention further includes a plurality of protruding bumps thereon which are designed to prevent the pen from rolling when the barrel thereof is positioned horizontally upon a flat surface. The protruding bumps 64 also have a secondary additional purpose in that they can be adapted to engage the cap 62 when positioned extending usually over the top opening 20 in order to facilitate detachable engagement of the cap 62 with respect to the barrel 12 adjacent the top opening 20 thereof.

The writing instrument 10 of the present invention provides a uniquely molded design which is actually co-molded with a unique method wherein two distinct materials can form a single final structure with the molded materials fixedly secured with respect to one another. With this method the high density polypropylene material is initially molded to form a framework and thereafter the thermoplastic rubber elastomer is formed into one or more channels defined in the barrel framework. The second molded materials are preferably of a thermoplastic rubber elastomer which is much more pliable and has enhanced flexible resilience as compared to the framework and, as such, a strong basic pen configuration can be co-molded with a softer more pliable gripping member to yield a final overall improved pen construction by a unique molding method not known heretofore. Although the flexible resilience of the thermoplastic rubber elastomer will be somewhat reduced since it is formed about a core of harder plastic, the pliability thereof can be recaptured by the inclusion of a plurality of voids defined in the outer surface thereof preferably in the form of dimples or channels which significantly enhance the tactile control and gripping comfort of the convex outer gripping surface thereof.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

What is claimed is:

1. An improved co-molded writing instrument with enhanced tactile control and gripping comfort which comprises:
   A. a barrel means defining an outer gripping surface therearound to facilitate holding and control of the writing instrument during usage thereof, said barrel means comprising:
      (1) a barrel framework means defining a tip opening therein, said barrel framework means further defining an axial bore means extending longitudinally therethrough and in fluid flow communication with said tip opening;
      (2) a gripping section defined on said barrel framework means and adapted to facilitate gripping of the writing instrument during use thereof, said gripping section including a hollow core member with said axial bore means extending axially therethrough, said hollow core member and said barrel framework means defining a gripping channel means therearound at said gripping section;
      (3) a barrel gripping means fixedly mounted within said gripping channel means extending around said hollow core member of said gripping section of said barrel means and fixedly secured thereto, said barrel gripping means being made of a material more flexibly resilient and pliable than said barrel framework means to facilitate gripping of the writing instrument and enhance tactile control thereof, said barrel gripping means and said barrel framework means being co-molded of dissimilar materials with said barrel gripping means being more flexibly resilient and pliable and together defining said outer gripping surface on said barrel housing means;
   B. a medium retaining means for holding and dispensing writing medium therefrom, said medium retaining means including:
      (1) a medium reservoir for retaining writing medium therewithin; and
      (2) a dispensing tip in fluid flow communication with said medium reservoir for facilitating dispensing of writing medium therefrom as desired, said medium retaining means being positionable within said axial bore means of said barrel framework means with said dispensing tip extending outwardly through said tip opening to facilitate marking therewith.

2. An improved co-molded writing instrument with enhanced tactile control and gripping comfort as defined in claim 1 wherein said hollow core member is tubular in shape with said axial bore means extending axially therethrough.

3. An improved co-molded writing instrument with enhanced tactile control and gripping comfort as defined in claim 1 wherein said gripping section is positioned on said barrel framework means adjacent said tip opening thereof to further facilitate tactile control and gripping comfort for marking with said dispensing tip of said medium retaining means.

4. An improved co-molded writing instrument with enhanced tactile control and gripping comfort as defined in claim 1 wherein said barrel framework means is made of a high density polypropylene to facilitate strength of said barrel framework means.

5. An improved co-molded writing instrument with enhanced tactile control and gripping comfort as defined in claim 1 wherein said gripping means is made of a thermoplastic rubber elastomer to enhance flexible resilience thereof.

6. An improved co-molded writing instrument with enhanced tactile control and gripping comfort as defined in claim 1 wherein said gripping section is capable of deforming to modify the orientation of the dispensing tip relative to the barrel gripping means for facilitating customizing the relative positioning thereof.

7. An improved co-molded writing instrument with enhanced tactile control and gripping comfort as defined in claim 1 wherein said barrel gripping means defines at least one compression slot means therein to facilitate flexible resilience of said gripping section during use thereof.

8. An improved co-molded writing instrument with enhanced tactile control and gripping comfort as defined in claim 7 wherein said compression slot means includes a plurality of compression slots extending laterally around the outer periphery of said barrel gripping means perpendicularly with respect to said axial bore means and spatially disposed with respect to one another to further enhance the flexible resilience of said gripping section when grasped.

9. An improved co-molded writing instrument with enhanced tactile control and gripping comfort as defined in claim 8 wherein said barrel gripping means defines at least one concave dimple means therein to further facilitate the flexible resilience of said gripping section during gripping thereof.

10. An improved co-molded writing instrument with enhanced tactile control and gripping comfort as defined in claim 9 wherein at least one of said concave dimple means is positioned at least partially within at least one of said compression slot means to be at least partially coextensive therewith to further enhance flexible resilience of said gripping section and facilitate grasping thereof.

11. An improved co-molded writing instrument with enhanced tactile control and gripping comfort as defined in claim 1 wherein said barrel framework means further defines a longitudinal channel means extending from said gripping section longitudinally along the outer gripping surface of said barrel means to facilitate holding of said barrel by a user.

12. An improved co-molded writing instrument with enhanced tactile control and gripping comfort as defined in claim 11 further comprising a supplemental gripping means positioned within said longitudinal channel means to enhance gripping of said barrel means by a user, said supplemental gripping means being made of a material more flexibly resilient than said barrel framework means to enhance tactile control and gripping comfort thereof.

13. An improved co-molded writing instrument with enhanced tactile control and gripping comfort as defined in claim 12 wherein said barrel framework means defines a design display member extending outwardly therefrom through said longitudinal channel means and through said supplemental gripping means positioned therein in order to be visible along the outer gripping surface of said barrel means.

14. An improved co-molded writing instrument with enhanced tactile control and gripping comfort as defined in claim 1 wherein said barrel framework means further defines a top opening therein in fluid flow communication with said axial bore means extending therethrough and spatially disposed thereon from said tip opening to facilitate removal and replacement of said medium retaining means with respect to said axial bore means.

15. An improved co-molded writing instrument with enhanced tactile control and gripping comfort as defined in claim 14 wherein said barrel framework means and said axial bore means extending therethrough are flared laterally outwardly larger adjacent to said top opening to facilitate molding thereof and placing and removing of said medium retaining means therein.

16. An improved co-molded writing instrument with enhanced tactile control and gripping comfort as defined in claim 1 further including a conical guide member defining a guide slot extending axially therethrough and wherein said barrel framework means includes a threaded collar member fixedly secured thereto and extending around said tip opening thereof, said threaded collar member being engageable with respect to said conical guide member for facilitating securement therebetween with said guide slot in registration with respect to said tip opening and said axial bore means to facilitate retaining and guiding of said dispensing tip of said medium retaining means during use thereof extending through said tip opening of said barrel framework means into and through said guide slot for marking therewith.

17. An improved co-molded writing instrument with enhanced tactile control and gripping comfort as defined in claim 1 further comprising a cap means and wherein said barrel means defines at least one protruding bump means positioned on the outer gripping surface thereof to facilitate preventing the improved writing instrument from rolling when laying horizontally upon a flat surface, said protruding bump means also being engageable with respect to said cap means when attached to said barrel means to facilitating detachable engagement therebetween.

18. An improved co-molded writing instrument with enhanced tactile control and gripping comfort as defined in claim 1 wherein said hollow core member is imperforate along said axial bore means.

19. An improved co-molded writing instrument with enhanced tactile control and gripping comfort which comprises:
A. a barrel means defining an outer gripping surface therearound to facilitate holding and control of the writing instrument during usage thereof, said barrel means comprising:
(1) a barrel framework means defining a tip opening therein, said barrel framework means further defining an axial bore means extending longitudinally therethrough and in fluid flow communication with said tip opening;
(2) a gripping section defined on said barrel framework means and adapted to facilitate gripping of the writing instrument during use thereof, said gripping section including a hollow core member being tubular in shape with said axial bore means extending axially therethrough, said hollow core member and said barrel framework means defining a gripping channel means therearound at said gripping section, said gripping section being capable of deforming to customize the shape of said barrel means for facilitating grasping thereof, said hollow core member and said gripping section being imperforate throughout said gripping channel means;
(3) a barrel gripping means fixedly mounted within said gripping channel means extending around said hollow core member of said gripping section of said barrel means and fixedly secured thereto, said barrel gripping means being made of a material more flexibly resilient and pliable than said barrel framework means to facilitate gripping of the writing instrument and enhance tactile control thereof, said barrel gripping means and said barrel framework means being co-molded of dissimilar materials with said barrel gripping means being more flexibly resilient and pliable and together defining said outer gripping surface on said barrel housing means, said barrel gripping means defining a plurality of compression slot means and concave dimple means therein to facilitate flexible resilience thereof;
B. a medium retaining means for holding and dispensing writing medium therefrom, said medium retaining means including:
(1) a medium reservoir for retaining writing medium therewithin; and
(2) a dispensing tip in fluid flow communication with said medium reservoir for facilitating dispensing of writing medium therefrom as desired, said medium retaining means being positionable within said axial bore means of said barrel framework means with said dispensing tip extending outwardly through said tip opening to facilitate marking therewith.

20. An improved co-molded writing instrument with enhanced tactile control and gripping comfort which comprises:
A. a barrel means defining an outer gripping surface therearound to facilitate holding and control of the writing instrument during usage thereof, said barrel means comprising:
(1) a barrel framework means defining a tip opening and a top opening therein spatially disposed from one another, said barrel framework means being flared outwardly laterally adjacent said top opening thereof, said barrel framework means further defining an axial bore means extending longitudinally therethrough from said tip opening to said top opening and being outwardly flared adjacent said top opening to facilitate access thereinto, said barrel framework means being made of a high density polypropylene to facilitate strength thereof, said barrel framework means further defining a longitudinal channel means extending from said gripping section longitudinally along the outer gripping surface of said barrel means to facilitate holding of said barrel by a user, said barrel framework means further including a threaded collar member fixedly secured thereto and extending around said tip opening thereof;

(2) a gripping section defined on said barrel framework means adjacent said tip opening and adapted to facilitate gripping of the writing instrument during use thereof, said gripping section including a hollow core member being tubular in shape with said axial bore means extending axially therethrough, said hollow core member and said barrel framework means defining a gripping channel means therearound at said gripping section, said gripping section being capable of deforming to customize the shape of said barrel means for facilitating grasping thereof, said hollow core member and said gripping section being imperforate throughout said gripping channel means;

(3) a barrel gripping means of a thermoplastic rubber elastomer for flexible resilience thereof, said barrel gripping means being fixedly mounted within said gripping channel means extending around said hollow core member of said gripping section of said barrel means and fixedly secured thereto, said barrel gripping means being more flexibly resilient and pliable than said barrel framework means to facilitate gripping of the writing instrument and enhance tactile control thereof, said barrel gripping means and said barrel framework means being co-molded of dissimilar materials with said barrel gripping means being more flexibly resilient and pliable and together defining said outer gripping surface on said barrel housing means, said barrel gripping means defining a plurality of compression slot means and concave dimple means therein to facilitate flexible resilience thereof, said compression slot means extending laterally around the periphery of said barrel gripping means perpendicularly with respect to said axial bore means for enhancing flexibility thereof, said concave dimple means being positioned at least partially coextensive with said compression slot means for further enhancing flexible resilience thereof;

(4) a supplemental gripping means positioned within said longitudinal channel means to enhance gripping of said barrel means by a user, said supplemental gripping means being made of a material more flexibly resilient than said barrel framework means to enhance tactile control and gripping comfort thereof, said barrel framework means defining a design display member extending outwardly therefrom through said longitudinal channel means and through said supplemental gripping means positioned therein in order to be visible along the outer gripping surface of said barrel means;

B. a conical guide member defining a guide slot extending axially therethrough, said threaded collar member being engageable with respect to said conical guide member for facilitating securement therebetween with said guide slot in registration with respect to said tip opening and said axial bore means;

C. a medium retaining means for holding and dispensing writing medium therefrom, said medium retaining means including:
  (1) a medium reservoir for retaining writing medium therewithin; and
  (2) a dispensing tip in fluid flow communication with said medium reservoir for facilitating dispensing of writing medium therefrom as desired, said medium retaining means being positionable within said axial bore means of said barrel framework means and within said guide slot of said conical guide member with said dispensing tip extending outwardly therethrough to facilitate marking therewith.

21. A method for manufacturing a co-molded writing instrument with enhanced tactile control and gripping comfort comprising:
  A. molding a barrel framework member being generally elongated with an axial bore means extending axially therethrough;
  B. defining a gripping section on the barrel framework member extending around the axial bore means to define a gripping channel extending therearound;
  C. molding a barrel gripping member within the gripping channel of a material more flexibly resilient than the material of the barrel framework to be fixedly secured to the gripping section of the barrel framework member and extending therearound; and
  D. forming a plurality of compression slots spatially disposed from each other and extending about the outer surface of the barrel gripping member to increase the flexible resilience thereof and to enhance tactile control and gripping comfort during holding thereof.

22. A method for manufacturing a co-molded writing instrument with enhanced tactile control and gripping comfort as defined in claim 21 wherein said molding of the barrel framework member is performed of a high density polypropylene material.

23. A method for manufacturing a co-molded writing instrument with enhanced tactile control and gripping comfort as defined in claim 21 wherein said molding of the gripping member is performed of a thermoplastic rubber elastomer material to enhance flexible resilience thereof.

24. A method for manufacturing a co-molded writing instrument with enhanced tactile control and gripping comfort as defined in claim 21 wherein the gripping section defined on the barrel framework is formed in the shape of a hollow core member.

25. A method for manufacturing a co-molded writing instrument with enhanced tactile control and gripping comfort as defined in claim 24 wherein the hollow core member is formed imperforate.

26. A method for manufacturing a co-molded writing instrument with enhanced tactile control and gripping comfort as defined in claim 21 further including forming of a plurality of concave dimples therein to enhance the flexible resilience of the barrel gripping member.

27. A method for manufacturing a co-molded writing instrument with enhanced tactile control and gripping comfort as defined in claim 26 wherein the compression slots and the concave dimples are formed at least partially coextensive with respect to one another to further enhance flexible resilience of the barrel member to facilitate gripping comfort and tactile control of the writing instrument by a user.

28. A method for manufacturing a co-molded writing instrument with enhanced tactile control and gripping comfort as defined in claim 21 wherein said compression slots extending peripherally around the outer surface of the barrel gripping member.

29. A method for manufacturing a co-molded writing instrument with enhanced tactile control and gripping comfort as defined in claim 21 wherein the gripping section defined on the barrel framework within the gripping channel is capable of selective bending thereof to allow customized modification of the shape of the generally elongated barrel framework member.

30. A method for manufacturing a co-molded writing instrument with enhanced tactile control and gripping comfort as defined in claim 21 further including defining a longitudinal channel extending along the elongated barrel framework member to facilitate grasping thereof.

31. A method for manufacturing a co-molded writing instrument with enhanced tactile control and gripping comfort as defined in claim 30 further including forming of a supplemental gripping member positioned within the longitudinal channel to further facilitate grasping thereof.

32. A method for manufacturing a co-molded writing instrument with enhanced tactile control and gripping comfort as defined in claim 31 wherein said longitudinal channel is formed with a design display member extending upwardly therethrough to be visible with the supplemental gripping member positioned secured within the longitudinal channel.

33. A method for manufacturing a co-molded writing instrument with enhanced tactile control and gripping comfort as defined in claim 21 wherein said molding of the barrel framework includes forming bump members extending outwardly from the elongated exterior thereof to minimize rolling of the writing instrument when placed upon a horizontal surface.

34. A method for manufacturing a co-molded writing instrument with enhanced tactile control and gripping comfort as defined in claim 33 further including forming a cap member positionable extending over each end of the writing instrument and engageable with respect to the bump members to facilitate detachable engagement thereof with respect to the barrel framework member.

* * * * *